United States Patent [19]
Riley et al.

[11] Patent Number: 4,607,089
[45] Date of Patent: Aug. 19, 1986

[54] GRAFTED SOY PROTEIN LATEX

[75] Inventors: Richard R. Riley, Hartville, Ohio; Charles E. Coco, St. Louis, Mo.

[73] Assignee: GenCorp Inc., Akron, Ohio

[21] Appl. No.: 770,453

[22] Filed: Aug. 29, 1985

Related U.S. Application Data

[63] Continuation-in-part of Ser. No. 644,517, Sep. 20, 1984, abandoned.

[51] Int. Cl.$^4$ ............................................. C08H 1/00
[52] U.S. Cl. ..................................... 527/201; 527/202
[58] Field of Search ........................ 527/200, 201, 202

[56] References Cited

U.S. PATENT DOCUMENTS

| 2,562,534 | 7/1951 | Coffman | 527/201 |
| 2,763,625 | 9/1956 | Illingsworth et al. | 527/201 |
| 3,313,749 | 4/1967 | Ready | 527/203 |
| 3,685,998 | 8/1972 | Miller | 527/201 |
| 4,048,416 | 9/1977 | Axen et al. | 527/201 |
| 4,417,025 | 11/1983 | Toba et al. | 527/313 |

Primary Examiner—Morton Foelak
Assistant Examiner—Nathan M. Nutter

[57] ABSTRACT

A conjugated diene such as butadiene-1,3 and a vinyl aryl monomer such as styrene are graft or over copolymerized on a dissolved or finely divided anionic fully caustic treated soy protein in aqueous alkaline media using minor effective amounts of an oil soluble azo catalyst, a chelating agent and a chain transfer agent to form a latex which can be used in paper coating compositions.

14 Claims, No Drawings

GRAFTED SOY PROTEIN LATEX

This application is a continuation-in-part of prior co-pending U.S. patent application Ser. No. 644,517, filed Sept. 20, 1984, and now abandoned entitled "Grafted Soy Protein Latex."

This invention relates to the copolymerization of conjugated dienes and vinyl aryl monomers in the presence of soy protein.

OBJECTS

It is an object of this invention to provide a process for graft or over copolymerizing conjugated dienes and vinyl aryl monomers in the presence of a soy protein.

Another object of this invention is to provide an alkaline latex of a graft or over copolymer of a conjugated diene and a vinyl aryl monomer on soy protein.

A further object of this invention is to provide paper coated with a graft or over copolymer of a conjugated diene and vinyl aryl monomer on soy protein.

These and other objects and advantages of the present invention will become more apparent to those skilled in the art from the following detailed description and working examples.

SUMMARY OF THE INVENTION

According to the present invention, a conjugated diene and vinyl aryl monomer can be graft or over copolymerized on dissolved or finely divided soy protein in aqueous alkaline media containing a free radical oil soluble azo polymerization initiator or catalyst, a chelating agent and a chain transfer agent to provide a latex useful in paper coating compositions. In this process the customary emulsifiers or surfactants are not necessary. Also, water soluble initiators such as peroxides and persulfates are not used since they do not appear to work in this aqueous graft copolymerization process. In some paper coating latices an acid containing comonomer is used, but, here, such a —COOH containing monomer is not needed. In using the latex in a paper coating composition additional cobinder is not required. The latex is useful as a binder for pigmented paper coating compositions to be printed by gravure or offset printing processes and is particularly useful in compositions for lightweight paper to be printed by the gravure process. It, also, may be used in cylinder boards.

DISCUSSION OF DETAILS AND PREFERRED EMBODIMENTS

The graft or over copolymerization is done in alkaline aqueous media. The soy protein is an anionic fully caustic treated soy protein. It is dissolved or rendered finely divided (colloidal suspension) in aqueous ammonium hydroxide or other suitable aqueous alkaline material before polymerization is initiated. In the graft copolymerization the conjugated diene is used in an amount of from about 25 to 50 parts by weight, the vinyl aryl monomer is used in an amount of from 30 to 60 parts by weight and the soy protein is used in an amount of from 10 to 30 parts by weight, the total of all three ingredients being 100 parts by weight.

Proteins, of course, in various forms are well known materials and have many uses. Please see "Encyclopedia Of Polymer Science And Technology," John Wiley & Sons, Inc., Vol. 2 (1965), Vol. 8 (1968), Vol. 9 (1968), Vol. 11 (1969) and Supplement Vol. 2 (1977).

Examples of copolymerizable conjugated diene monomers which can be used are those diene monomers of from 4 to 6 carbon atoms such as butadiene-1,3 (preferred), isoprene, 2,3-dimethyl butadiene-1,3, piperylene, chloroprene and so forth and mixtures thereof. Examples of copolymerizable vinyl aryl monomers are those having from 8 to 12 carbon atoms such as styrene (preferred), alpha methyl styrene, p-tertiary butyl styrene, para methyl styrene, 3-ethyl styrene, methyl vinyl toluene and para vinyl toluene and the like and mixtures thereof.

The chelating agent is used in a very minor amount sufficient to chelate any interfering ion such as the ferric or ferrous ion, or other polymerization interfering ion or material. In general it is used in an amount of from about 0.01 to 1.0, preferably about 0.05, part by weight per 100 parts by weight of the butadiene-1,3, styrene and soy protein. Examples of some chelating agents are trisodium ethylene diamine tetraacetate dihydrate (preferred), ethylenediaminetetraacetic acid tetrasodium salt, technical ethylenediaminetetraacetic acid tetrasodium salt, ethylenediaminetetraacetic acid tetrasodium salt dihydrate, ethylenediaminetetraacetic acid trisodium salt monohydrate, ethylenediaminetetraacetic acid disodium salt dihydrate, ethylenediaminetetraacetic acid, nitrilotriacetic acid disodium salt monohydrate, nitrilotriacetic acid, N-hydroxyethylethylenediaminetriacetic acid trisodium salt, N-hydroxyethylethylenediaminetriacetic acid trisodium salt dihydrate, ethanoldiglycine disodium salt (or disodium N-hydroxyethyliminodiacetic acid), diethanolglycine sodium salt (or sodium dihydroxyethyl glycine) and the like and mixtures of the same.

The initiator or catalyst used is an oil soluble azo initiator or catalyst. Azo initiators for free radical polymerization are well known. In this connection please see the "Encyclopedia Of Polymer Science And Technology," Vol. 2, 1965, pages 278–295, John Wiley & Sons, Inc. Of these initiators it is preferred to use the azonitriles. Examples of some of these compounds are azobisdimethylvaleronitrile, 2,2'-azobisisobutyronitrile (preferred), 2,2'-azobis-2-methylbutyronitrile and 2,2'-azobis (methylisobutyrate) and the like and mixtures of the same. Only minor amounts by weight of the initiator are necessary to effect copolymerization.

Chain transfer agents or modifiers are used during the graft copolymerization to control molecular weight, gel and so forth. While various modifiers or chain transfer agents have been proposed and may be used such as benzene, toluene, triphenyl methane, carbon tetrachloride and so forth, it is preferred to use mercaptans such as the alkyl and/or aralkyl mercaptans of from 8 to 18 carbon atoms of which the tertiary alkyl mercaptans are much preferred. Examples of some mercaptans are n-octyl mercaptan, n-dodecyl mercaptan, t-octyl mercaptan, t-dodecyl mercaptan (also preferred), p-tridecyl mercaptan, tetradecyl mercaptan, hexadecyl mercaptan and so forth and mixtures thereof. These modifiers are used generally in a total amount of from about 0.15 to 0.9 phm (parts 100 parts monomers).

Temperatures used during graft copolymerization should be sufficient to effect polymerization by activation of the catalyst and double bonds of the monomer(s). They should not be too high to cause a runaway reaction and not too low to retard polymerization. In general, the temperature is preferably from about 40° to 80° C. Times for polymerization may vary from about 8 to 14 hours depending on the degree of polymerization desired. Generally, it is desired to carry polymerization to about 100% conversion.

The graft copolymerization should be conducted under alkaline conditions utilizing materials like NH$_4$OH and the like. In general the pH of the polymerization media should be from about 8.5 to 10, preferably from about 9 to 9.5.

The water used during graft copolymerization should be free of deleterious materials and preferably should be distilled or ion exchanged. Sufficient water is used to enable maintenance of the emulsion or latex and to enable proper mixing or stirring of the ingredients during polymerization to obtain the desired rate and degree of polymerization, heat transfer and so forth. The solids content after removal of water may be above about 30% by weight.

Graft copolymerization should be conducted in a closed reactor, such as a pressure reactor, fitted with a stirrer or other agitating means, evacuating means, heating and cooling means, with means to flush with or pump in an inert gas such as nitrogen, helium, argon, neon and the like if desired, with means to charge monomers, water, initiators and so forth, venting means, and with means to recover the polymer and so forth. The reactor should be cleaned or flushed out between polymerization runs to remove traces of initiators, modifiers, residues and so forth which might interfere with subsequent polymerizations. There should be sufficient agitation or stirring of the polymerization media to ensure thorough mixing, diffusion, contact and so forth.

Free radical aqueous polymerization and copolymerization of ethylenically unsaturated monomers is well known to those skilled in the art. In this connection please see Whitby et al, "Synthetic Rubber," John Wiley & Sons, Inc., New York, 1954; Bovey et al, "Emulsion Polymerization," High Polymers, Vol. IX, Interscience Publishers, Inc., 1955; Schildknecht, "Vinyl and Related Polymers," John Wiley & Sons, Inc., New York, 1952 and "Encyclopedia of Polymer Science and Technology," Vol. 3 (1965), Vol. 5 (1966), Vol. 7 (1967), Vol. 9 (1968) and Vol. 11 (1969), Interscience Publishers, a division of John Wiley & Sons, Inc., New York.

In the practice of the present invention, the polymerization may be considered as a graft copolymerization, over copolymerization, core/shell copolymerization or an interpolymerization. The technique of polymerizing or copolymerizing one or more monomers in the presence of a polymer or a substrate, "grafting technique," is known and is frequently called graft polymerization or graft copolymerization. In this connection, please see "Proceedings Of The Third Rubber Technology Congress," 1954, W. Heffer & Sons, Ltd., Cambridge, pages 185–195; "Copolymerization," High Polymers, Vol. XVIII, Ham, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; "Block and Graft Copolymerization," Ceresa, Vol. 1 (1973) and Vol. 2 (1976), John Wiley & Sons, Ltd., New York and "Graft Copolymers," Polymer Reviews, Vol. 16, Battaerd and Tregear, Interscience Publishers, a division of John Wiley & Sons, New York, 1967. The graft copolymer may contain all graft copolymer but also may be a mixture of homopolymers, copolymers as well as the graft itself, depending on the rate of polymerization of the monomers, the polymerization conditions and so forth.

The graft copolymer latices of the present invention can be treated during or after polymerization with antioxidants, biocides, defoamers, additional alkaline material such as NH$_4$OH and so forth.

All of the graft copolymerization ingredients may be charged to the reactor at once and graft copolymerized continued to completion or a seed type of latex may be formed by first graft copolymerizing part of the conjugated diene and vinyl aryl monomer on the soy protein in the presence of some of the polymerization materials followed by further additions of the conjugated diene and vinyl aryl monomer along with the remaining polymerization materials.

The latices of the present invention can be mixed with finely divided fillers such as paper coating fillers like clays, kaolin, calcium carbonate, titanium dioxide, zinc oxide and other inorganic fillers used in paper coating compositions. Thickening agents, viscosity stabilizers, additional alkaline material like NH$_4$OH and so forth can be added to these compositions. In general paper coating compositions of the present invention will have a solids content of from about 20 to 70% by weight. The solids comprising from about 2 to 20% by weight, on a dry weight basis, of the graft copolymer and from 98 to 80% by weight of the paper coating fillers. The paper coating composition may be spread on paper and hot calendared to cure or set the graft copolymer and form an adherent and dried coating on the paper.

The following examples will serve to illustrate the present invention with more particularity to those skilled in the art. In the examples the parts are parts by weight unless otherwise indicated.

EXAMPLE 1

To a clean, N$_2$ flushed reactor were charged 215 parts of deionized water, 0.05 part of SEQUESTRENE Na$_3$, 18.50 parts of soy protein, 0.10 part of DREW L-198 and sufficient aqueous ammonium hydroxide to provide a pH of from about 9 to 9.5 and to solubilize the soya protein. The temperature of the mixture was raised to 150° F. (65.6° C.), and the reactor was evacuated minimally to avoid losing NH$_4$OH. Next there were added to the reactor 13.3 parts of styrene containing 0.60 part of VAZO 64 followed by 0.15 part of SULFOLE 120 and 13.8 parts of butadiene-1,3, and polymerization was conducted to a total solids content of from about 14 to 16% by weight. Additional increments of styrene, SULFOLE 120 and butadiene-1,3 were added to the reactor to obtain a final theoretical solids content of the latex of about 32.2%. Then 0.5 part of DREW L-198 was added to the latex. The reactor was cooled and then the latex was stripped of residual monomers. Finally, there were added to the latex 0.80 part aqueous PROXEL GXL (25% solids) and sufficient aqueous NH$_4$OH to obtain a pH of from about 9.0 to 9.5. During this graft copolymerization the total amounts added of butadiene-1,3 were 41.25 parts, of SULFOLE 120 were 0.45 part and of styrene were 39.88 parts. Additional similar graft or over copolymerizations were conducted in 20 gallon reactors, and the results obtained are shown in Table 1, below:

TABLE 1

Butadiene/Styrene Soy Protein Graft Copolymer Latex

| Run No. | Properties Before Stripping | | | | | Properties After Stripping | | | | | Polymerization Reaction Time To Completion (hrs) |
|---|---|---|---|---|---|---|---|---|---|---|---|
| | TSC (%) | pH | S.T. (d/cm) | B.V. (cps) | R.M. (%) | TSC (%) | pH | S.T. (d/cm) | B.V. (cps) | R.M. (%) | Prefloc (%) | |
| A | 32.3 | 9.4 | 52.2 | 862 | 0.84 | 32.3 | 9.1 | 43.2 | 504 | 0.35 | 0.06 | 10 |
| B | 30.9 | 9.5 | 54.5 | 894 | 0.46 | 31.2 | 9.8 | 54.9 | 550 | 0.42 | 0.02 | 11 |
| C | 31.2 | 9.1 | 49.5 | 714 | 0.38 | 31.7 | 9.7 | 54.0 | 590 | 0.31 | 0.04 | 11 |

TSC - Percent by weight total solids content.
S.T. - Surface tension (dyne/centimeter).
B.V. - Brookfield viscosity in centipoises.
R.M. - Residual monomers.
Notes for the example:
SEQUESTRENE $Na_3$ - Trisodium ethylene diamine tetraacetate dihydrate. Ciba-Geigy Corp.
SULFOLE 120 - t-dodecyl mercaptan, avg. mol. wt. 198, calc. purity wt. % 96.8 and mercaptan sulfur wt. % 15.4. Phillips Petroleum Co., Rubber Chem. Div.
DREW L-198 - Silicate defoamer. Drew Chemical Corp.
PROXEL GX - Chemical biocide. ICI Americas Inc.
VAZO 64 - 2,2'-azobisisobutyronitrile or $(CN_3)_2(CN)CN=NC(CN)(CH_3)_2$. du Pont
Soy protein - Anionic fully caustic treated soy protein in powder form. It has an average molecular weight of about 84.9 $\times 10^3$ daltons and a surface tension of 40.3 dyne/cm at a pH of 7.0. 95+ % soluble above a pH of 9.0

EXAMPLE 2

Additional Runs were made according to the method of Example 1, supra, with the following variations. The results are shown in Table 2, below:

TABLE 2

| Run | TSC | pH | S.T. | B.V. | % Light Transmission | Polymerization Time Hours to 20% TSC | Polymerization Reaction Time Hours To Completion | Notes |
|---|---|---|---|---|---|---|---|---|
| D[1] | 31.4 | 9.1 | 53.5 | 305 | 56 | 5.5 | 10 | Control |
| E[2] | 29.0 | 9.2 | 52.5 | 270 | 58 | 9.0 | 15 | Polymerized at a slower rate. |
| F[3] | 30.5 | 9.1 | 56.4 | 232 | 60 | 6.0 | 10 | |
| G[4] | 30.0 | 8.9 | 54.4 | 3050 | 72 | 3.7 | | Smaller particle size and higher viscosity. Reaction rate faster. |

Monomers and backbone used during a graft polymerization:
D[1] 18 parts soy protein, 41.5 parts butadiene -1,3, 40.0 parts styrene
E[2] 18 parts soy protein, 41.5 parts isoprene, 40.0 parts styrene
F[3] 18 parts soy protein, 41.5 parts butadiene -1,3, 40.0 parts paramethyl styrene
G[4] 30 parts soy protein, 35.5 parts butadiene -1,3, 34.0 parts styrene

EXAMPLE 3

Graft copolymers were prepared in bottles according to the general process of Example 1 except that the amounts of styrene, butadiene-1,3 and soy protein were varied in producing the graft copolymer latices. After the graft copolymerizations were completed, films from portions of the latices were cast, cured (dried) and given physical tests. Properties of the latices, also, were determined. The results obtained are shown in Table 3, below:

TABLE 3

| Run No. | Parts By Weight (pbw) | | | Cure Temperature 275° F. (135° C.) | | Cure Temperature 325° F. (263° C.) | | Graft Copolymer Latex Properties | | | | |
|---|---|---|---|---|---|---|---|---|---|---|---|---|
| | Soy Protein | Sty. | Bd. | Ultimate Elongation % | Ultimate Tensile Strength, PSI | Ultimate Elongation, % | Ultimate Tensile Strength, PSI | Total Solids Content (pbw) | pH | Brookfield Viscosity (cps) | Surface Tension (d/cm) | % Light Transmission |
| 1 | 12.5 | 40 | 47.5 | 162 | 488 | 203 | 578 | 35.6 | 8.4 | 290 | 65.1 | 39 |
| 2 | " | 45 | 42.5 | 347 | 648 | 363 | 703 | 34.9 | 8.4 | 280 | 63.2 | 40 |
| 3 | " | 50 | 37.5 | 298 | 692 | 303 | 849 | 36.5 | 8.3 | 290 | 65.1 | 42 |
| 4 | " | 60 | 27.5 | 270 | 1758 | 223 | 2087 | 35.6 | 8.3 | 280 | 63.2 | 38 |
| 5 | 18.5 | 35 | 46.5 | 60 | 1039 | 51 | 1028 | 39.0 | 8.4 | 290 | 65.1 | 40 |
| 6 | " | 40 | 41.5 | 683 | 1079 | 107 | 1050 | 39.1 | 8.4 | 300 | 65.1 | 39 |
| 7 | " | 45 | 36.5 | 138 | 949 | 150 | 1157 | 40.7 | 8.4 | 290 | 67.1 | 41 |
| 8 | " | 50 | 31.5 | 157 | 1270 | 193 | 1173 | 43.0 | 8.4 | 320 | 63.2 | 39 |
| 9 | 6.5 | 40 | 53.5 | — | — | — | — | — | — | — | — | — |
| 10 | " | 50 | 43.5 | — | — | — | — | — | — | — | — | — |
| 11 | " | 60 | 33.5 | 443 | 342 | 455 | 400 | 34.2 | 8.4 | 300 | 65.1 | 42 |

EXAMPLE 4

Paper coating tests were undertaken with compositions using the graft copolymer latex of Example 1, Run No. A. Two formulations were made:
Formulation I:
 6 pbw of dry graft copolymer (as latex),
 70 pbw kaolin clay, 0.8 micron particle size,
 30 pbw delaminated kaolin clay,
 water added to adjust to a solids content of 57.8% and
 NH4OH added to adjust to a pH of 9.

Formulation II:
  6 pbw dry graft copolymer (as latex),
  70 pbw kaolin cldded to adjust to a pH of 9.
Formulation II:
  6 pbw dry graft copolymer (as latex),
  70 pbw kaolin clay, 0.8 micron particle size,
  30 pbw delaminated kaolin clay,
  water added to adjust to a solids content of 55%,
  NH4OH added to adjust to a pH of 9 and
  0.2 pbw of thickener (Rohm and Haas Co. TT 935 acrylate type thickener).

Two types of paper coating heads were used:
SD—less than 3 inches of exposure between applied coating and trailing blade (short dwell) and
LD—from 10 to 20 inches of exposure between application roller and trailing blade (long dwell).

The raw paper stock used was a lightweight (very thin) web offset gravure paper (about 29 lbs/ream) containing some ground wood. Sufficient coating was applied to hide any color in the raw paper stock and fill up any pores in the paper.

The results on testing are shown in Table 4, below:

TABLE 4

| Run Number | 20 | 21 | 22 | 23 | 24 | 25 | 26 | 27 |
| --- | --- | --- | --- | --- | --- | --- | --- | --- |
| Coating Head | SD | SD | SD | SD | LD | LD | LD | LD |
| Formulation | I | I | I | I | II | II | II | II |
| Coat Weight, Pounds/3300 ft.$^2$ (two weeks after coating) Not calendered | 7.0 | 6.8 | 4.6 | 3.9 | 2.7 | 4.0 | 5.0 | 5.5 |
| Coat Weight, Pounds/3300 ft.$^2$ (at time of coating) Not calendered | 8.5 | 6.4 | 6.1 | 5.2 | 3.2 | 4.9 | 6.1 | 7.4 |
| Supercalendering, Nips$^{(1)}$ | 2 | 2 | 4 | 6 | 8 | 6 | 4 | 2 |
| Gloss, 1 hour (after calendering)$^{(2)}$ | 68.3 | 66.2 | 60.4 | 58.4 | 46.6 | 59.2 | 60.1 | 63.0 |
| Gloss, 36 hours (after calendering)$^{(2)}$ | 64.3 | 61.5 | 54.0 | 49.9 | 44.8 | 52.5 | 58.1 | 56.9 |
| Heliotest, 35 Kg.$^{(3)}$ | 101 | 103 | 89 | 107 | 22 | 75 | 70 | 92 |
| Heliotest, 20 Kg.$^{(3)}$ | 41 | 31 | 21 | 18 | 4 | 17 | 41 | 32 |

$^{(1)}$Samples were supercalendered at 750 pli (pounds/linear inch) and 130° F. (54.4° C.).
$^{(2)}$75 degree reflectance reading. Acceptance level is an average figure of about 60 after aging.
$^{(3)}$Pressure applied to laboratory printing tester ink printed from etched printing roll as in commercial gravure printing process. Highest number is best.

We claim:

1. The method which comprises free radical aqueous alkaline graft or over copolymerization of at least one copolymerizable conjugated diene monomer having from 4 to 6 carbon atoms and at least one copolymerizable vinyl aryl monomer having from 8 to 12 carbon atoms in the presence of a solubilized or finely divided anionic fully caustic treated soy protein in the presence of minor effective amounts by weight of at least one chelating agent, at least one chain transfer agent and at least one oil soluble free radical azo initiator to form a latex, where
  (a) said diene monomer is used in an amount of from about 25 to 50 parts by weight,
  (b) said vinyl aryl monomer is used in an amount of from 30 to 60 parts by weight and
  (c) said soy protein is used in an amount of from 10 to 30 parts by weight, the sum of (a), (b) and (c) being 100 parts by weight.

2. The method according to claim 1 where said conjugated diene monomer is butadiene-1,3, said vinyl aryl monomer is styrene, said initiator is an azonitrile and said chain transfer agent is at least one mercaptan selected from the group consisting of alkyl and aralkyl mercaptans having from 8 to 18 carbon atoms.

3. The method according to claim 2 where said mercaptan is a tertiary alkyl mercaptan.

4. The method according to claim 3 where said initiator is 2,2'-azobisisobutyronitrile, said chain transfer agent is t-dodecyl mercaptan and said chelating agent is trisodium ethylene diamine tetraacetate dihydrate.

5. The product produced by the method of claim 1.
6. The product produced by the method of claim 2.
7. The product produced by the method of claim 3.
8. The product produced by the method of claim 4.

9. An aqueous, alkaline latex containing a graft or over copolymer of at least one copolymerizable conjugated diene monomer having from 4 to 6 carbon atoms and at least one copolymerizable vinyl aryl monomer having from 8 to 12 carbon atoms on a solubilized or finely divided anionic fully caustic treated soy protein wherein in said graft copolymer
  (a) said diene monomer is present in an amount of from about 25 to 50 parts by weight,
  (b) said vinyl aryl monomer is present in an amount of from 30 to 60 parts by weight and
  (c) said soy protein is present in an amount of from 10 to 30 parts by weight, the sum of (a), (b) and (c) being 100 parts by weight.

10. An aqueous alkaline latex according to claim 9 where said conjugated diene monomer is butadiene-1,3 and said vinyl aryl monomer is styrene.

11. A composition comprising finely divided fillers and an aqueous, alkaline latex containing a graft or over copolymer of at least one copolymerizable conjugated diene monomer having from 4 to 6 carbon atoms and at least one copolymerizable vinyl aryl monomer having from 8 to 12 carbon atoms on a solubilized or finely divided anionic fully caustic treated soy protein wherein in said graft copolymer
  (a) said diene monomer is present in an amount of from about 25 to 50 parts by weight,
  (b) said vinyl aryl monomer is present in an amount of from 30 to 60 parts by weight and
  (c) said soy protein is present in an amount of from 10 to 30 parts by weight, the sum of (a), (b) and (c) being 100 parts by weight, said composition also comprising from about 20 to 70% by weight of solids which, on a dry weight basis, comprises from about 2 to 20% by weight of the graft copolymer and from about 98 to 80% by weight of the fillers.

12. A composition according to claim 11 where said conjugated diene monomer is butadiene-1,3, said vinyl aryl monomer is styrene and said fillers are paper coating fillers.

13. Paper having an adherent, cured and dried coating comprising from about 2 to 20% by weight of a graft or over copolymer and from 98 to 80% by weight of paper coating fillers, said graft or over copolymer comprising at least one copolymerizable conjugated diene monomer having from 4 to 6 carbon atoms and at least one copolymerizable vinyl aryl monomer having from 8 to 12 carbon atoms on a solubilized or finely divided anionic fully caustic treated soy protein wherein in said graft copolymer
   (a) said diene monomer is present in an amount of from about 25 to 50 parts by weight,
   (b) said vinyl aryl monomer is present in an amount of from 30 to 60 parts by weight and
   (c) said soy protein is present in an amount of from 10 to 30 parts by weight, the sum of (a), (b) and (c) being 100 parts by weight.

14. Paper according to claim 13 where said conjugated diene monomer is butadiene-1,3 and said vinyl aryl monomer is styrene.

* * * * *